No. 733,971. PATENTED JULY 21, 1903.
K. DE KANDÓ.
LIQUID RHEOSTAT OPERATED BY COMPRESSED AIR.
APPLICATION FILED MAY 25, 1901.
NO MODEL.

WITNESSES:
F. W. Wright
E. W. Collins

INVENTOR
KOLOMAN DE KANDÓ
BY
Howson and Howson
HIS ATTORNEYS

No. 733,971. Patented July 21, 1903.

UNITED STATES PATENT OFFICE.

KOLOMAN DE KANDÓ, OF BUDAPEST, AUSTRIA-HUNGARY.

LIQUID RHEOSTAT OPERATED BY COMPRESSED AIR.

SPECIFICATION forming part of Letters Patent No. 733,971, dated July 21, 1903.

Application filed May 25, 1901. Serial No. 61,916. (No model.)

*To all whom it may concern:*

Be it known that I, KOLOMAN DE KANDÓ, a subject of the Emperor of Austria-Hungary, residing at Budapest, in the Kingdom of Hungary, Empire of Austria-Hungary, have invented new and useful Improvements in Liquid Rheostats Operated by Compressed Air, of which the following is a specification.

This invention consists of a regulating device for liquid rheostats operated by compressed air. An example of a rheostat of this character is described in United States Patent No. 677,454, dated July 2, 1901.

My regulating device is a throttle-valve electrically controlled from the circuit, which is itself to be controlled through the medium of the liquid rheostat.

Figure 1:
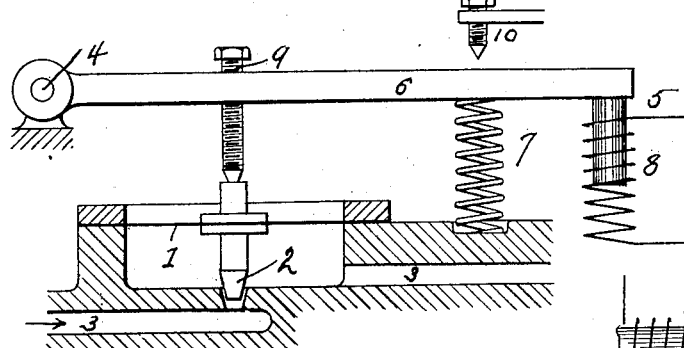
Figure 2:
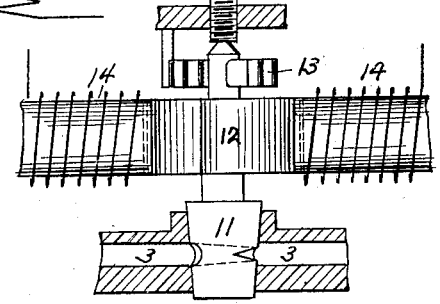
Figure 3:
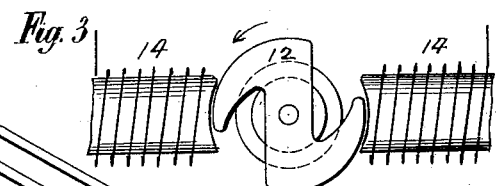

In the accompanying drawings, Figure 1 is a sectional side view of one form of controlling means and throttle-valve. Figs. 2 and 3 are a sectional side elevation and a plan, respectively, of a modified form of valve; and Fig. 4 is a schematic view showing the connections to the rheostat and throttle-valve magnets.

Figure 4:
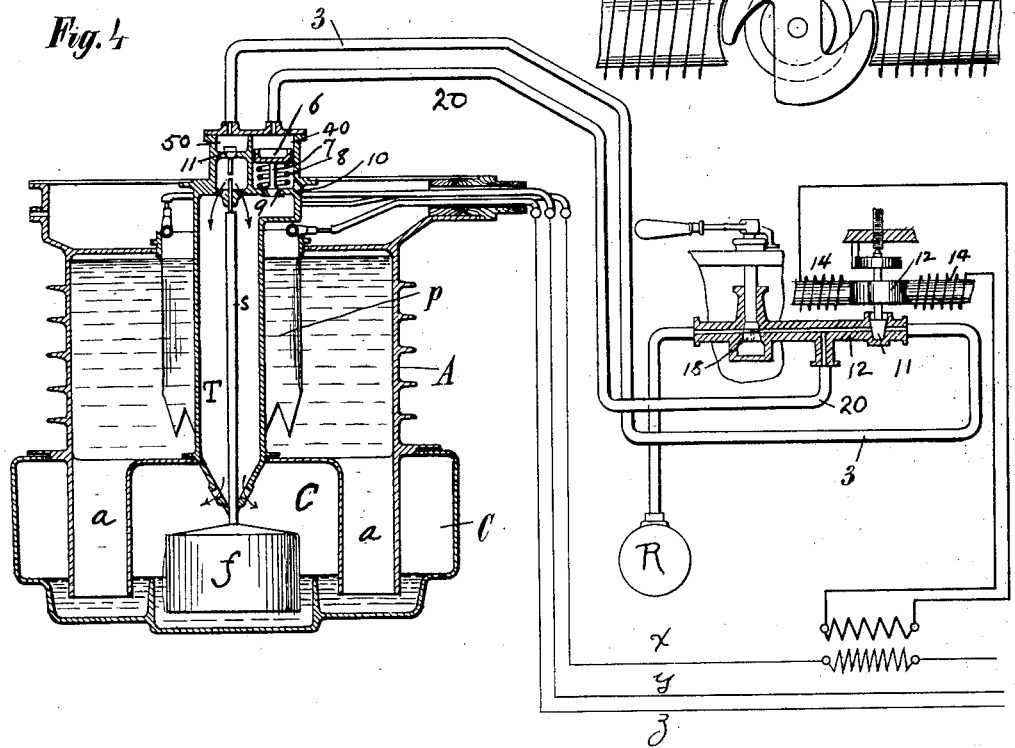

In my British Patent No. 16,960 of 1899 I have shown a liquid rheostat which may be controlled by the throttle means of this invention, and I have illustrated that form of rheostat in Fig. 4, in which R is a compressed-air reservoir, and C is a chamber containing a liquid and a float $f$ on a spindle $s$. A chamber A connects with the chamber C by depending legs $a\ a$ dipping into it. Plates $p$ are hung in the chamber A, each one electrically connected to one of the power-conductors $x\ y\ z$. The spindle $s$ passes through a tube T, connected with the chamber C and having valve-chambers 40 50 at the top. The valve-chamber 40 has a piston 6 and valve-spindle 7 to close the opening 9 to the tube T, while a spring 8 tends to open the valve. An opening 10 below the piston communicates with the atmosphere.

The chamber 50 has an upwardly-opening valve 11, adapted to be lifted off its seat by the spindle $s$ when the latter is in its upper position. A pipe 3 from the valve-chamber 50 leads to a pipe 12, connecting through the cock 18 with compressed-air reservoir R. The cock 18 has two passages, one adapted to connect the reservoir and pipe 12 and one (shown dotted) adapted to let the air escape from 20 to the atmosphere.

A pipe 20 from the chamber 40 leads direct to the pipe 12; but the air from the cock 18 has to pass through the throttle-valve 11 before reaching the pipe 3.

The operation is as follows: The handle of the cock 18 is turned to let air into the pipe 12 from R. The air immediately passes through the pipe 20 to the chamber 40, where it forces the piston 6 downward, cutting off the tube T from the atmosphere. Compressed air in less volume has meantime passed the throttle 11, according to the size of its opening, and through pipe 3 entered the tube T, forcing the liquid of the chamber C into the chamber A, in which it rises around the plates $p$, reducing the resistance between them. When the descent of the float $f$ has allowed the valve 11 to seat, the supply of air through pipe 3 is of course cut off from chamber C and the liquid ceases to rise in A. To lower the liquid-level in A, the cock 18 is turned to open the pipe 20 to the atmosphere, allowing the spring 8 to raise the piston 6 and open the port 9 and allowing the air to escape from the tube T through the opening 10 in the wall of the chamber 40.

The use of the liquid in the chamber A and about the plates $p\ p$ allows the current in the mains to increase, causing a consequent increase of current in the secondary circuit in any proportion desired, according to the windings, to magnetize the magnets 14 14, and thus more or less throttle the air to the pipe 3 to retard its passage to the chamber 50, and thus retard the increase of current by retarding the rise of the liquid.

An armature of any suitable construction is adapted to actuate and control the movement of the throttle-valve, this armature in turn being controlled by the current flowing through the line. I have shown it in Fig. 4 as being controlled through two electromagnets 14 14, placed in series with the secondary coils of a transformer T, whose primary coils are in the line-circuit. It is, however, obvious that the magnet-coils might themselves be directly placed in the circuit.

In the regulator shown in Fig. 1, 3 is the air-conduit, 2 is the throttle-valve carried by a flexible diaphragm 1, and 6 is an armature pivoted at 4, having a set-screw 9 resting against the top of the stem of the valve 2. A spring 7 tends to keep the valve off its seat. The upward movement of the valve is limited by a back-stop 10. A solenoid 8 is connected with the electric circuit and placed so that a core 5 on the armature 6 will come within its influence. The spring 7 and the diaphragm keep the valve open except when the current passing through the solenoid 8 produces an overbalancing magnetic pull in the solenoid, whereupon the air-supply will be more or less shut off.

In Fig. 2 I have shown a rotary throttle-valve instead of the vertically-movable valve before described. This valve 11 has a shaft s, carrying an S-shaped armature 12, and it also has a coiled spring 13, tending to rotate it in a direction contrary to that pointed out by the arrow in Fig. 3. Electromagnets 14, with their coils connected in the line-circuit, act upon the armature 12 to tend to turn it in the direction of the arrow, Fig. 3. The greater the current strength through these coils the more will the armature 12 and valve 11 be rotated. The controlling action is the same as before described.

I do not limit myself to the construction of armatures and valves shown, as other styles could be employed.

I claim as my invention—

1. A liquid rheostat and a compressed-air conduit therefor, a throttle-valve in the conduit adapted to more or less cut off the air-supply from the rheostat and means in the electric circuit to control the movement of the valve, substantially as described.

2. A liquid rheostat and a compressed-air conduit therefor, in combination with a throttle-valve in the conduit, an armature to actuate the valve and electrical means in the circuit to actuate the armature, substantially as described.

3. A liquid rheostat and a compressed-air conduit therefor, in combination with a rotatable throttle-valve in the conduit, an armature for the valve and electromagnetic means for actuating the armature.

4. A liquid rheostat and a compressed-air conduit therefor, in combination with a rotatable throttle-valve in the conduit, an armature rotatable with the valve and mounted on the stem of the valve, a coiled spring secured to the stem and electric magnets energized by the line-current to actuate the armature, substantially as described.

In testimony whereof I have signed my name to this specification in the presence of two subscribing witnesses.

KOLOMAN DE KANDÓ.

Witnesses:
PAUL BÖLNKEY,
FRANK DYER CHESTER.